United States Patent
Ohno et al.

(10) Patent No.: US 7,616,128 B2
(45) Date of Patent: Nov. 10, 2009

(54) AUDIO IDENTIFYING DEVICE, AUDIO IDENTIFYING METHOD, AND PROGRAM

(75) Inventors: Yoshio Ohno, Tokyo (JP); Shinichi Yoshizawa, Osaka (JP); Tetsu Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 256 days.

(21) Appl. No.: 11/632,716

(22) PCT Filed: Jun. 13, 2005

(86) PCT No.: PCT/JP2005/010800

§ 371 (c)(1), (2), (4) Date: Jan. 18, 2007

(87) PCT Pub. No.: WO2006/011310

PCT Pub. Date: Feb. 2, 2006

(65) Prior Publication Data

US 2008/0001780 A1    Jan. 3, 2008

(30) Foreign Application Priority Data

Jul. 23, 2004  (JP) .............................. 2004-215139

(51) Int. Cl.
*G08G 1/00* (2006.01)

(52) U.S. Cl. ...................... 340/904; 340/902

(58) Field of Classification Search ......... 340/902–904, 340/907, 943, 693.3, 906, 465, 475, 479; 701/35, 224, 301; 381/56
See application file for complete search history.

(56) References Cited

U.S. PATENT DOCUMENTS 4,952,931 A * 8/1990 Serageldin et al. .......... 340/902
6,362,749 B1 * 3/2002 Brill ........................... 340/902
6,404,351 B1 * 6/2002 Beinke ........................ 340/902
6,788,964 B1 * 9/2004 Satomura et al. ......... 455/575.9
6,812,854 B1 * 11/2004 Edwin et al. ................ 340/901
6,859,147 B2 * 2/2005 Buscemi ..................... 340/902

FOREIGN PATENT DOCUMENTS

JP          7-095681          4/1995

(Continued)

*Primary Examiner*—Anh V La
(74) *Attorney, Agent, or Firm*—Wenderoth, Lind & Ponack, L.L.P.

(57) ABSTRACT

An audio identifying device which can transmit with certainty audio information which is important for a user, according to an importance level of input audio information which varies depending on the action of the user includes: a checking unit 104 which judges a type of inputted audio; a user action obtainment unit 108 which detects an action of the user; an output mode determination unit 106 which determines an output mode of an audio identification result regarding the input audio by checking, with output mode definition information stored in the output mode definition information storage unit 107, the result judged by the checking unit 104 and the result detected by the user action obtainment unit 108; and the audio identification result output processing unit 110 which outputs the audio identification result on which processing according to the output mode determined by the audio identification result has been performed by checking the judgment result determined by the output mode determination unit 106 with the output processing method definition information stored in an output processing method definition information storage unit 111.

18 Claims, 10 Drawing Sheets

FOREIGN PATENT DOCUMENTS

| | | |
|---|---|---|
| JP | 7-182587 | 7/1995 |
| JP | 7-327295 | 12/1995 |
| JP | 10-063995 | 3/1998 |
| JP | 10-090406 | 4/1998 |
| JP | 10-258688 | 9/1998 |
| JP | 2000-351339 | 12/2000 |
| JP | 2002-213985 | 7/2002 |
| JP | 2002-344268 | 11/2002 |
| JP | 2003-004521 | 1/2003 |
| JP | 2003-329475 | 11/2003 |
| JP | 2004-020817 | 1/2004 |

* cited by examiner

FIG. 2A

| Output mode | Audio processing method |
|---|---|
| 5 | Reproduced at 70dBA |
| 4 | Reproduced at 65dBA |
| 3 | Reproduced at 60dBA |
| 2 | Reproduced at 55dBA |
| 1 | Reproduced at 50dBA |

FIG. 2B

| User action item | Detailed action |
|---|---|
| Turn signal | Turn on / Turn off |
| Hand brake | Apply / Release |

FIG. 2C

| Audio type | Shift value of output mode | | | |
|---|---|---|---|---|
| | Turn signal | | Hand brake | |
| | Turn on | Turn off | Apply | Release |
| Railroad crossing alarm | +2 | -2 | -2 | +2 |
| Siren of fire fighting vehicle | +1 | -1 | 0 | 0 |
| Horn | +1 | -1 | 0 | 0 |
| Engine sound of motorcycle | +2 | -2 | -1 | +1 |
| Engine sound of vehicle | +2 | -2 | -1 | +1 |

FIG. 2D

| Audio type | Current output mode |
|---|---|
| Railroad crossing alarm | 5 |
| Siren of fire fighting vehicle | 4 |
| Horn | 4 |
| Engine sound of motorcycle | 5 |
| Engine sound of vehicle | 5 |

FIG. 5A

| Output mode | Audio processing method |
|---|---|
| 5 | Reproduced at 70dBA |
| 4 | Reproduced at 65dBA |
| 3 | Reproduced at 60dBA |
| 2 | Reproduced at 55dBA |
| 1 | Reproduced at 50dBA |

FIG. 5C

| User state item | State |
|---|---|
| Driving state | Being able to drive |

FIG. 5D

| Audio source information item | State |
|---|---|
| Audio arrival direction | Front / Rear |

FIG. 5B

| Audio type | Output mode :(Driving action · Audio arrival direction) | | | |
|---|---|---|---|---|
| | (Being stopped · Front) | (Being able to drive · Front) | (Being stopped · Rear) | (Being able to drive · Rear) |
| Railroad crossing alarm | 5 | 5 | 1 | 1 |
| Siren of fire fighting vehicle | 3 | 5 | 2 | 3 |
| Horn | 2 | 3 | 2 | 3 |
| Engine sound of motorcycle | 1 | 2 | 1 | 2 |
| Engine sound of vehicle | 1 | 1 | 1 | 1 |

FIG. 8A

| Importance level | Audio processing method |
|---|---|
| 5 | Reproduced at 70dBA |
| 4 | Reproduced at 65dBA |
| 3 | Reproduced at 60dBA |
| 2 | Reproduced at 55dBA |
| 1 | Reproduced at 50dBA |

FIG. 8B

| Audio type | Importance level (Walking) | Importance level (Stop) : (Walking state) |
|---|---|---|
| Horn of vehicle | 5 | 2 |
| Warning of approaching train to platform | 3 | 3 |
| Audio announcements on train for notifying arrival to station | 2 | 5 |

FIG. 8C

| User state item | State |
|---|---|
| Walking state | Walking / Stop |

AUDIO IDENTIFYING DEVICE, AUDIO IDENTIFYING METHOD, AND PROGRAM

TECHNICAL FIELD

The present invention relates to an audio identifying device which identifies an audio type and provides the user with a result of the identification.

BACKGROUND ART

In recent years, due to improvement in sound insulation inside vehicles, it is becoming more difficult to hear horns of other vehicles and sirens of emergency vehicles. Furthermore, since people more frequently wear audio equipment that has advanced sound-proof properties, such as headphones for portable music players or earphones for cellular phones, it is also becoming more difficult to hear horns of vehicles, announcements on a train, and the sound of trains passing platforms in stations. Thus, with the improvement of sound insulation inside vehicles and wearing of the audio equipment that has advanced sound-proof properties, the problem that the user has difficulties in hearing important ambient sound signal is recently increasing.

In order to solve this problem, various techniques have been suggested previously (for example, refer to Patent References 1 to 3).

FIG. 10 is a diagram showing a configuration of the first conventional technology described in the Patent Reference 1.

As shown in FIG. 10, the conventional audio identifying device is a device that transmits/reproduces, to the closed space, audio information arising in the external space, and includes: an audio collecting unit 1 which converts sound in an external space to an electric signal s; an audio reproduction unit 2 which is located in a closed space and reproduces the audio by converting the electric signal s; a signal control unit 3 which blocks/passes the electric signal s; a feature extraction unit 4 which extracts a significant feature from the electric signal s; a condition storage unit 5 which stores a feature condition of the signal; and a feature judgment unit 6 which judges whether or not the condition is satisfied by comparing the signal converted by the audio collecting unit 1 with the feature condition stored in the condition storage unit 5.

Then, when the feature judgment unit 6 judges that a predetermined condition is not satisfied, the signal control unit 3 blocks the signal, and when judging that the condition is satisfied, the signal control unit 3 passes the signal so that the user can hear only necessary audio which satisfies the condition.

Furthermore, according to the second conventional technology described in the Patent Reference 2, in an audio reproducing device installed in moving objects such as vehicles, a vehicle position detection unit detects a current position, and a volume/frequency automatic adjusting unit controls reproduced audio outputted by an output device, using the acoustic feature information stored in a volume/frequency feature storage unit, depending on the detected current position. With this, the audio reproducing device is configured such that the reproduced audio which is outputted inside a moving object may have an optimal acoustic feature according to the current position. For example, in the case where the vehicle position detection unit detects the current position as the vicinity of a railroad crossing, the audio reproducing device can lower the volume of a vehicle audio system installed in the vehicle so that the user can easily hear a railroad crossing alarm.

Furthermore, the third conventional technology described in the Patent Reference 3 provides a signal identifying circuit which detects a signal issued by emergency vehicles, alarms, or the like, and an audio quality circuit which judges a distance between a vehicle and a target audio source, and change in the distance. Judging from the distance to the target audio source and a degree of emergency, devices are suggested which automatically adjust the volume of audio equipment that has advanced sound-proof properties such as vehicle audio systems and headphones for portable music players.

Patent Reference 1: Japanese Laid-Open Patent Application No. 7-95681

Patent Reference 2: Japanese Laid-Open Patent Application No. 2002-344268

Patent Reference 3: Japanese Laid-Open Patent Application No. 7-327295

DISCLOSURE OF INVENTION

Problems that Invention is to Solve

However, according to the configuration of the first conventional technology, since an audio identification result is outputted based on a judgment whether or not input audio which satisfies a predetermined acoustic feature condition exists, the user is notified of input audio information always in a similar output mode. Therefore, there is a problem that the user can not understand the importance of the audio identification result which varies depending on the circumstances of the user.

Furthermore, according to the configuration of the second conventional technology, an acoustic feature is determined only based on the vehicle position information. Thus, for example, there is a problem that, in the case where the vehicle is stuck in the vicinity of a railroad crossing for a long time due to traffic congestion, even when the railroad crossing alarm is not sounding, an acoustic feature of lowering the reproduction volume of the vehicle audio system is set, and consequently, the user can not listen to the audio of the vehicle audio system at a preferable volume.

Furthermore, according to the configuration of the third conventional technology, a case is assumed that even when the user who is driving the vehicle confirms that the railroad crossing alarm is sounding ahead of the vehicle, the user stops the vehicle, and there is no need to lower the volume of the radio of the vehicle audio system. Here, there is a problem that, while the signal identifying circuit detects the railroad crossing alarm, the state in which the radio has been turned off continues.

The present invention has been conceived in view of the aforementioned problems, and the object is to provide an audio identifying device that identifies an ambient audio signal and notifies the user of the identification result, and to provide the audio identification result information in more suitable information presentation modes for the user.

Means to Solve the Problems

In order to achieve the aforementioned object, the audio identifying device according to the present invention is an audio identifying device which identifies audio which is present in an ambient environment outside of a vehicle and provides a result of the identification for a user who drives the vehicle, and includes: an audio type judgment unit that judges a type of the audio using a feature of an audio signal which represents the audio; a user action detection unit that detects a driving action of the user; an audio storage unit that stores the audio signal; and an identification result output unit that determines an output mode for providing the user with the identification result based on the type judged by the audio type judgment unit and the driving action detected by the user action detection unit, and that outputs, in the determined output mode, the audio signal stored in said audio storage unit as the identification result.

With the present configuration, it is possible to output, in the output mode determined based on the action of the user (for example, an output volume or the number of outputs), an identification result regarding the audio which is present in an ambient environment outside the vehicle. With this, it becomes possible to provide the user with the identification result in a suitable output mode which reflects the importance level of the identification result to be assumed according to the circumstance which varies depending on the action of the user.

Here, the audio identifying device further includes an audio source direction detection unit that detects a direction from which the audio arrives, wherein the identification result output unit may determine the output mode further based on the detection result obtained by the audio source direction detection unit.

With this, since the output mode is determined further based on the direction from which the input audio arrives, the audio identifying device which provides the user with the identification result efficiently can be realized, by making a distinction between: the output mode of an important identification result regarding input audio which arrives from the direction requiring the user to pay attention to; and the output mode of a less important identification result regarding input audio which arrives from the direction requiring the user not to pay attention to.

Effects of the Invention

According to the audio identifying device of the present invention, it is possible to provide the user with an identification result regarding input audio in a suitable output mode which reflects the importance level to be assumed according to the circumstance which varies depending on the action of the user. Thus, it is possible to provide an audio identifying device with which the user can understand the audio identification result with certainty and effectively.

BRIEF DESCRIPTION OF DRAWINGS

FIG. 2A is a diagram showing an example of output processing method definition information, FIG. 2B is a diagram showing an example of the action of the user, FIG. 2C is a diagram showing an example of output mode definition information, and FIG. 2D is a diagram showing an example of current output modes.

FIG. 5A is a diagram showing another example of output processing method definition information, FIG. 5B is a diagram showing another example of output mode definition information, FIG. 5C is a diagram showing an example of the state of the user, and FIG. 5D is a diagram showing an example of an audio source state.

FIGS. 8A to 8C are diagrams regarding the identifying device according to the second embodiment of the present invention. FIG. 8A is a diagram showing an example of output processing method definition information, FIG. 8B is a diagram showing an example of importance level definition information, and FIG. 8C is a diagram showing an example of the state of the user.

Figure 1:
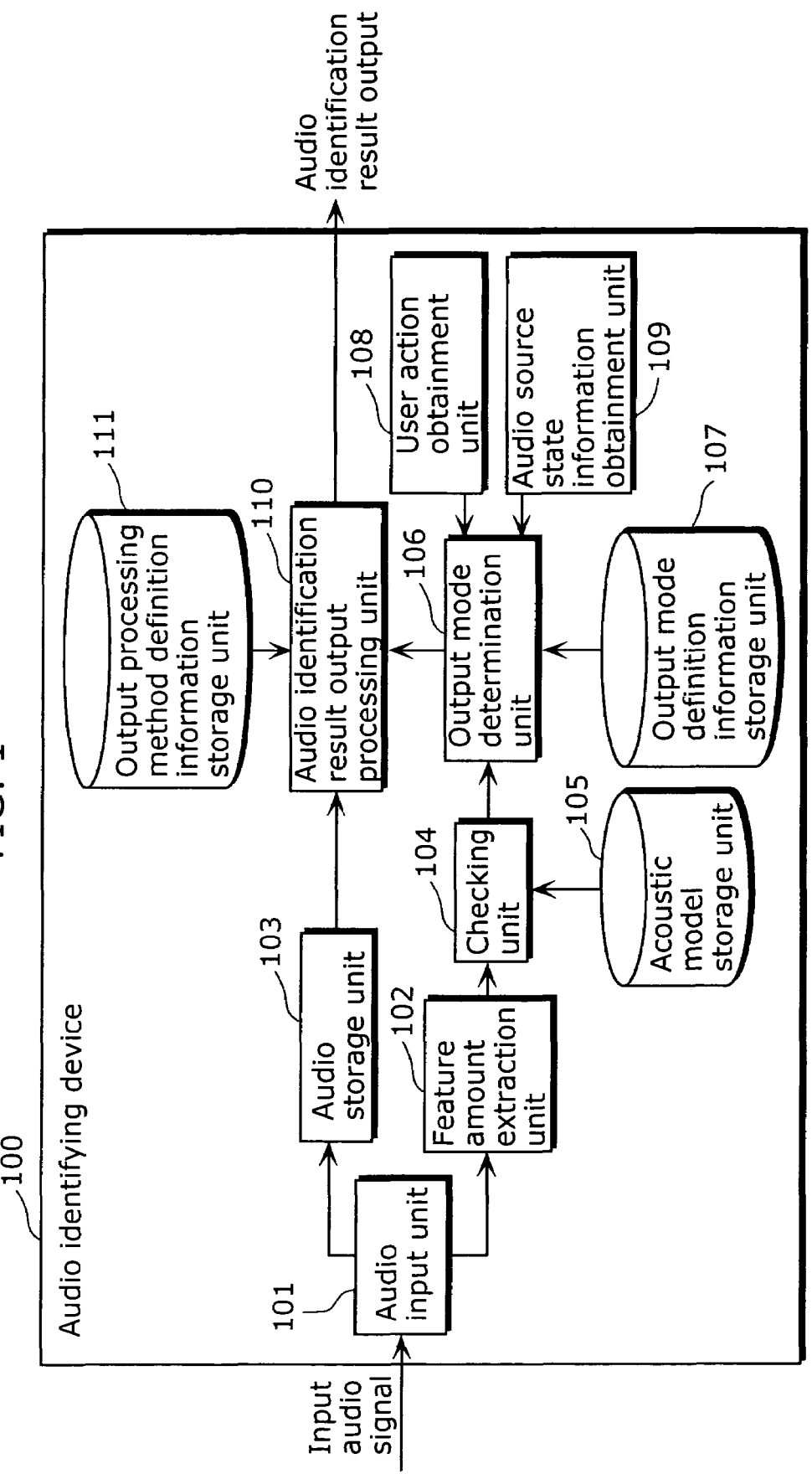
FIG. 1 is a block diagram showing a configuration of the audio identifying device according to the first embodiment of the present invention.

NUMERICAL REFERENCES 100, 100a Audio identifying device
101 Audio input unit
102 Feature amount extraction unit
103 Audio storage unit
104 Checking unit
105 Acoustic model storage unit
106 Output mode determination unit
107 Output mode definition information storage unit
108 User action obtainment unit
109 Audio source state information obtainment unit
110 Audio identification result output processing unit
111 Output processing method definition information storage unit
200, 300 Vehicle
201 Turn indicator
206 Audio information importance level judgment unit
207 Importance level definition information storage unit
1 Audio collecting unit
S Electrical signal
2 Audio reproduction unit
3 Signal control unit
4 Characteristic extraction unit
5 Condition storage unit
6 Characteristic judgment unit

BEST MODE FOR CARRYING OUT THE INVENTION

The embodiments of the present invention are described hereinafter with reference to the diagrams.

First Embodiment

First, an audio identifying device of the first embodiment of the present invention is described using FIGS. 1 to 6.

The audio identifying device of the first embodiment is installed in a vehicle. It is a device which identifies audio information outside of the vehicle, determines an output mode of the identification result regarding the audio information based on the action of the user, and provides the identification result in the determined output mode for the user. Here, it is assumed that the user is driving the vehicle equipped with the present device, more specifically, the action of the user is a driving action. The present device provides the identification result for the user in a suitable output mode which reflects an importance level to be assumed depending on the current state of the user, which varies according to the driving action of the user.

Note that the present invention does not limit specific details of the identification result. For example, in the broad sense, notification information, which is obtained by judging a type of the audio information and is notified to the user according to the judgment result through the senses of hearing, sight, touch, and the like, is an example of the identification result. Furthermore, the audio outside of the vehicle obtained by reproducing the audio information itself is an example of the identification result.

FIG. 1 is a block diagram showing a functional configuration of the audio identifying device according to the present first embodiment.

As shown in FIG. 1, the audio identifying device 100 according to the present first embodiment includes an audio input unit 101, a feature amount extraction unit 102, an audio storage unit 103, a checking unit 104, an acoustic model storage unit 105, an output mode determination unit 106, an output mode definition information storage unit 107, a user action obtainment unit 108, an audio source state information obtainment unit 109, an audio identification result output processing unit 110, and an output processing method definition information storage unit 111.

Here, the feature amount extraction unit 102 and the checking unit 104 are examples of audio type judgment units, the output mode determination unit 106 and the audio identification result output processing unit 110 are examples of identification result output units, the audio storage unit 103 is an example of an audio storage unit, and the user action obtainment unit 108 is an example of a user action detection unit.

The audio input unit 101 can be implemented using: a microphone which collects an audio signal which is present in an ambient environment outside the vehicle; and an A/D converter which converts the audio signal into a digital signal at a sampling frequency of 12 kHz and with precision of A/D conversion of 16 bit. The digital signal of the input audio obtained by this audio input unit 101 is transmitted to the feature amount extraction unit 102 and the audio storage unit 103.

The feature amount extraction unit 102 extracts an acoustic feature amount that represents audio features, such as a spectrum and a cepstrum, and transmits the extracted feature amount to the checking unit 104. For example, in the feature amount extraction unit 102, an acoustic feature amount can be composed of 16th order MFCC coefficients, 16th order ΔMFCC coefficients, and a 1st order Δpower which are extracted in an MFCC analytical method.

The audio storage unit 103 is implemented by a Random Access Memory (RAM) and the like having a storage area for temporarily holding input audio.

The acoustic model storage unit 105 is a storage device, such as a hard disk, in which one or more acoustic models are stored which have been learned for each audio type. As compositions of the acoustic models, the Hidden Markov Model (HMM) which is generally used for speech recognition can be used. For example, 3 states left-to-right/4 Gaussian mixture/continuous density/HMMs are learned per audio type, and stored in the acoustic model storage unit 105. In the present first embodiment, five types of audio, "railroad crossing alarm", "sirens of a fire fighting vehicle", "horns", "engine sound of a motorcycle", and "engine sound of a vehicle" are assumed as ambient audio outside of the vehicle, and the acoustic models corresponding to these types of sounds are stored in the acoustic model storage unit 105.

The checking unit 104 checks the acoustic models stored in the acoustic model storage unit 105 with the acoustic feature amount corresponding to the input audio transmitted from the feature amount extraction unit 102, judges how much the input audio is similar to each of the five acoustic models, and transmits the judgment result to the output mode determination unit 106. The checking unit 104 may, for example, transmit, to the output mode determination unit 106, a judgment result indicating that the audio type corresponding to the acoustic model which is the most similar to the input audio has been judged as the audio type of the input audio.

Note that known audio identifying methods described above are used as a method of extracting audio feature amounts, and a composition method and a checking method of acoustic models (for example, refer to Kazuhiro Miki, Takanobu Nishiura, Satoshi Nakamura, Kiyohiro Shikano, "Environmental Sound Discrimination Based on Hidden Markov Model", the Institute of Electronics, Information and Communication Engineers Transactions on Electronics, SP99-106, pp. 79-84 (1999)).

The output processing method definition information storage unit 111 stores definition information of output processing methods which are defined, in advance, for each output mode of audio information.

FIG. 2A is a diagram showing an example of the definition information regarding the output processing methods stored in the output processing method definition information storage unit 111. As shown in FIG. 2A, in this output processing method definition information, it is defined that input audio is reproduced at a volume corresponding to each of the five output modes and the input audio is outputted as the identification result. The output modes exemplified herein are represented by the values from 1 to 5, and the magnitude of each value reflects the extent of an importance level to which the user should be notified of the identification result.

The user action obtainment unit 108 is implemented by a sensor which detects an action of the user, obtains information regarding the action of the user, and outputs the information to the output mode determination unit 106.

FIG. 2B is a diagram showing an example of the action of the user obtained by the user action obtainment unit 108. The driving actions of the user exemplified in FIG. 2B, such as "turn on/turn off a turn signal" or "apply/release a hand brake" can be detected by installing sensors respectively in the hand brake and the turn indicator of the vehicle.

The output mode definition information storage unit 107 stores the definition information of the importance levels which are defined, in advance, for each audio type.

FIG. 2C is a diagram showing an example of output mode definition information stored in the output mode definition information storage unit 107. As shown in FIG. 2C, "railroad crossing alarm", "sirens of a fire fighting vehicle", "horns", "engine sound of a motorcycle", and "engine sound of a vehicle" are shown as types of input audio to be identified, and shift values used for updating the output mode in the case where the driving action of the user is detected are defined.

The output mode determination unit 106 is a processing unit which determines an output mode of an identification result regarding input audio, based on the judgment result obtained from the checking unit 104, information regarding the action of the user obtained from the user action obtainment unit 108, and the output mode definition information stored in the output mode definition information storage unit 107. For this processing, the output mode determination unit 106 stores current output modes for respective output types, for example, using a resistor, an RAM, or the like which is not illustrated in the diagram.

FIG. 2D is a diagram showing an example of current output modes for respective audio types stored in the output mode determination unit 106.

Once the output mode determination unit 106 obtains information regarding the action of the user from the user action obtainment unit 108, it obtains a shift value of the output mode corresponding to the action of the user from the output mode definition information storage unit 107, and adds the obtained shift value to the current output mode for each audio type so as to update the current output mode to a new output mode represented by the value after the addition.

Then, along with this updating operation, when the output mode determination unit 106 obtains the judgment result from the checking unit 104, it outputs, to the audio identification result output processing unit 110, the current output mode of the audio type indicated by the judgment result.

The audio identification result output processing unit 110 is a processing unit which: determines which acoustic processing is performed on the audio signal stored in the audio storage unit 103, based on the output mode obtained from the output mode determination unit 106 and the definition information of the output processing method defined for each output mode stored in the output processing method definition information storage unit 111; and performs the determined acoustic processing on the audio signal. Note that adjustment of the volume of the audio to be reproduced is one of the examples of the acoustic processing, and the audio identification result output processing unit 110 determines at which volume input audio is reproduced, and then, reproduces, as an audio identification result output, the audio signal on which the determined acoustic processing has been performed (adjustment of volume in this example).

The operations of the audio identifying device 100 configured as described above are described hereinafter with reference to FIG. 3.

Figure 3:
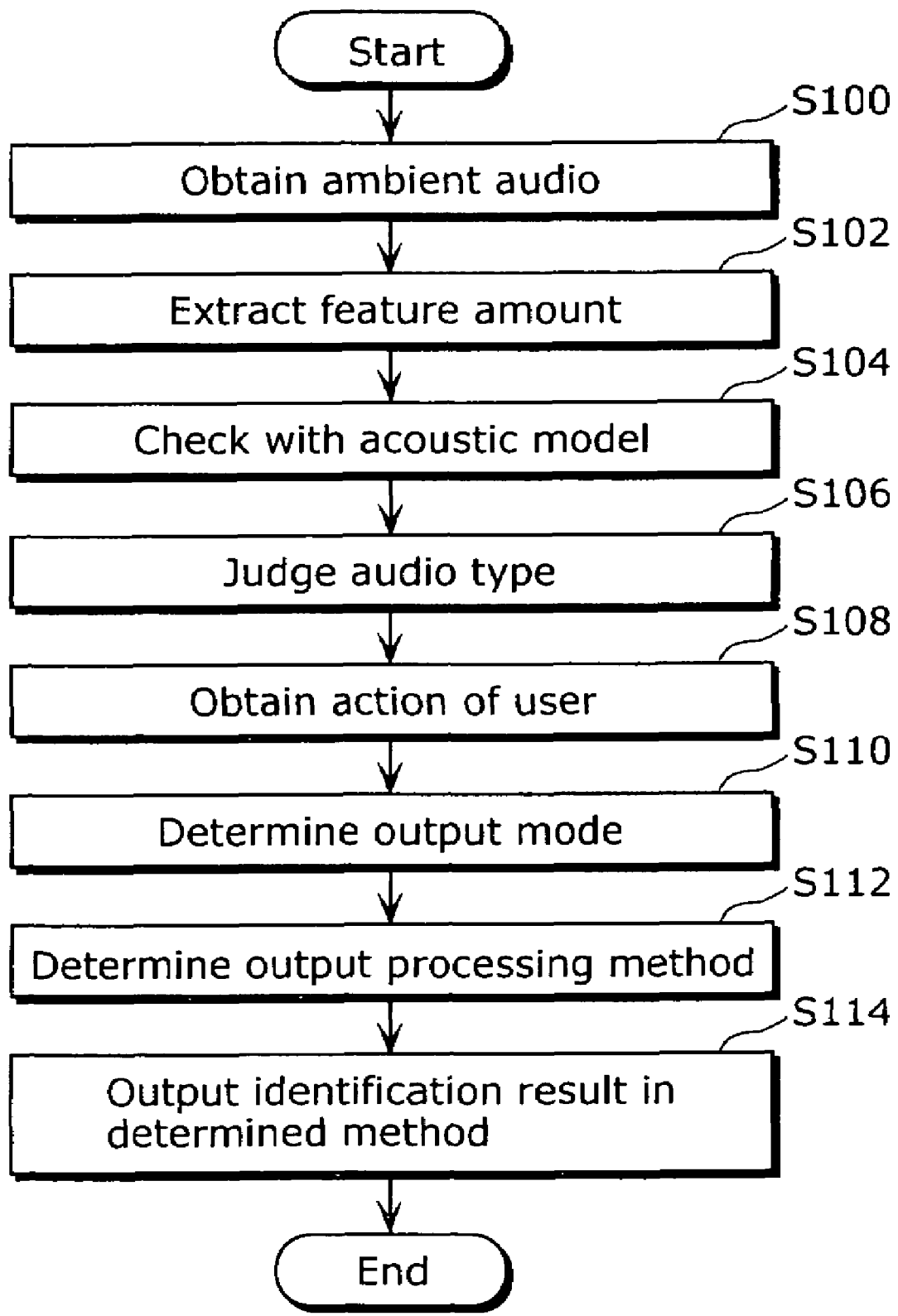
FIG. 3 is a flowchart showing processing operations of the audio identifying device according to the present first embodiment.

FIG. 3 is a flowchart showing processing operations of the audio identifying device 100.

First, the audio identifying device 100 obtains ambient audio outside the vehicle as input audio in the audio input unit 101 (S100). After converting the obtained ambient audio outside the vehicle to a digital signal, it is stored in the audio storage unit 103, and it is transmitted to the feature amount extraction unit 102, and the feature amount extraction unit 102 extracts the acoustic feature amount (S102).

The extracted feature amount is transmitted from the feature amount extraction unit 102 to the checking unit 104, the checking unit 104 checks the feature amount with the acoustic models for each audio type stored in the acoustic model storage unit 105 (S104), and judges the audio type (S106). Then, the checking unit 104 transmits the judgment result of the audio type to the output mode determination unit 106. As the specific example, it is assumed in the description hereinafter that a judgment that the inputted ambient audio outside the vehicle is the most similar to "railroad crossing alarm" is made.

Next, the output mode determination unit 106 obtains information regarding the action of the user obtained by the user action obtainment unit 108 (S108), and updates the current output mode which is stored in the output mode definition information storage unit 107 using the shift value corresponding to the action of the user which is represented by this information. Then, among the updated and current output modes, an output mode corresponding to the audio type judged by the checking unit 104 is determined as an output mode for providing the identification result regarding the input audio for the user (S110).

As the specific example, it is assumed in the description hereinafter that an action of the user "turn on a turn signal" is detected when the current output mode for all audio types is determined to be "3".

In this case, since the detected action of the user is an action of "turn on a turn signal", the output mode determination unit 106 refers to the shift value corresponding to the action of "turn on a turn signal" from the output mode definition information described in FIG. 2C and adds the shift value so as to update the current output mode to the value described in FIG. 2D. Then, the output mode is determined to be "5" which corresponds to the current "railroad crossing alarm" after the update.

The output mode determined in such a manner is transmitted from the output mode determination unit 106 to the audio identification result output processing unit 110.

Then, the audio identification result output processing unit 110 refers to the output processing method definition information described in FIG. 2A, and determines a method corresponding to the received output result (S112). As the output mode is "5" in the above example, an audio processing method of reproducing the audio signal stored in the audio storage unit 103 at "70 dBA" is determined as an audio identification result output.

Then, the audio identification result output processing unit 110 reads the input audio stored in the audio storage unit 103, outputs the identification result in the determined method (S114), and ends the processing.

Figure 4A:
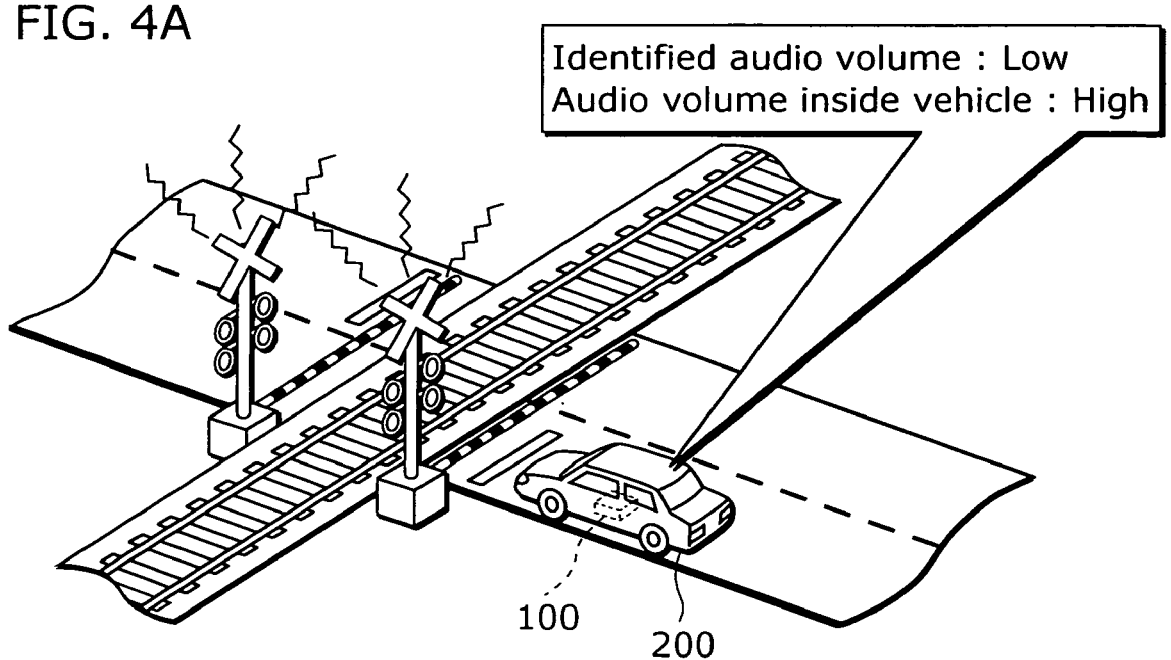
FIGS. 4A and 4B are diagrams for describing respective operation examples of the audio identifying device according to the present first embodiment.
Figure 4B:
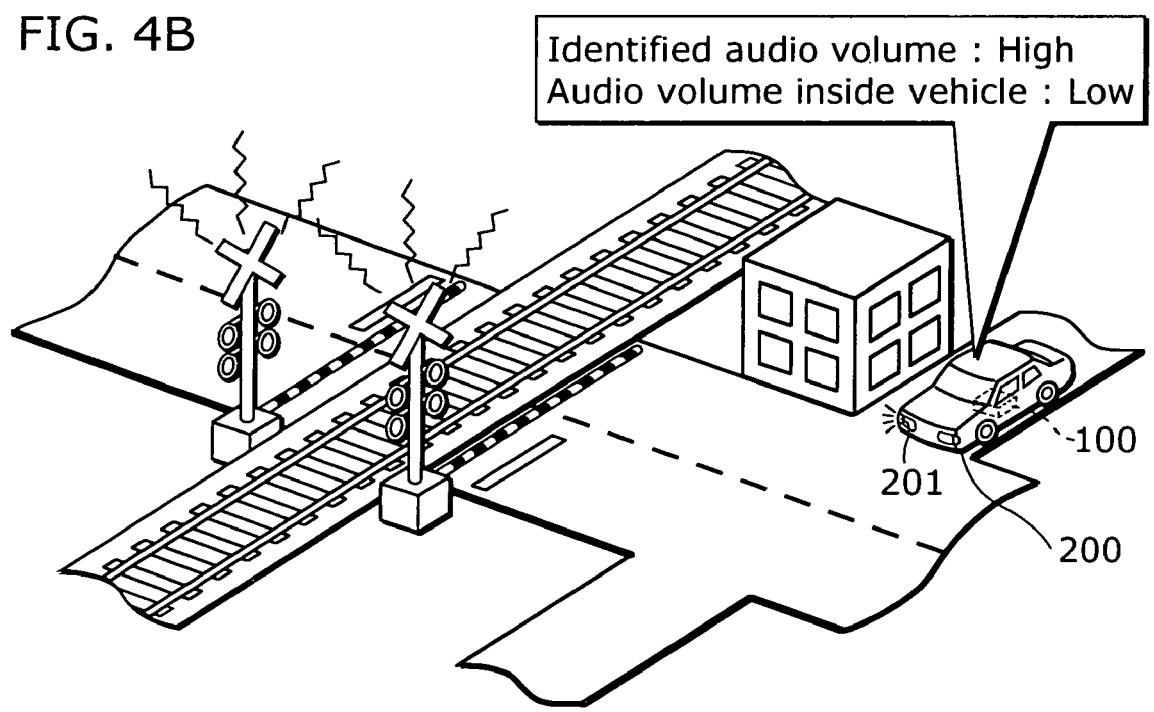

Another specific example of outputting an audio identification result in a different output mode depending on the circumstance which varies according to the action of the user is described using FIGS. 4A and 4B.

FIG. 4A shows that a railroad crossing gate is closed, the railroad crossing alarm is sounding, and a vehicle 200 equipped with the audio identifying device 100 is stopped in front of this railroad crossing by applying the hand brake.

In other words, under the aforementioned conditions, it is conceivable that "railroad crossing alarm" has been inputted in the audio identifying device 100 as ambient audio outside of the vehicle, and the audio identifying device 100 has already obtained "apply a hand brake" as a driving action of the user.

Here, in the case where the audio identifying device 100 determines the output mode of the input audio "railroad crossing alarm" under these conditions, according to the output mode definition information described in FIG. 2B, an output mode (the shift value "−2") which is two levels lower than the state before applying the hand brake is determined so that the audio identifying device 100 outputs the audio identification result by "10 dBA" lowered volume according to the output processing method definition information described in FIG. 2A. Note that when the user performs an action, "release a hand brake" after that, the volume returns to the same volume as the volume before applying the hand brake, as a two level higher output mode (the shift value "+2") is determined.

Furthermore, in this case, when audio of the vehicle audio system is played back inside the vehicle 200, while the audio volume remains unchanged, the audio identifying device 100 may output the audio identification result and reproduce the outputted result at a volume lower than the car.

As such, in the case where it is judged, according to the circumstance which varies depending on the action of the user, that the importance level of notifying the user of the identification result regarding the input audio is low (more specifically in this example, during the time when the vehicle is stopped with certainty, from applying the hand brake till it is released), the user can continue to listen to the audio of the vehicle audio system without being interrupted by reproduction of the audio identification result, by lowering the volume of the audio identification result output.

Next, FIG. 4B shows that the railroad crossing gate is closed, the railroad crossing alarm is sounding, and the vehicle 200 equipped with the audio identifying device 100 is to turn right toward the railroad crossing from the road where the user can not visually identify this railroad crossing.

In other words, under the aforementioned conditions, "railroad crossing alarm" is inputted in the audio identifying device 100 as the ambient audio outside of the vehicle. Furthermore, as a turn indicator 201 indicating turning right is activated, it is conceivable from the sensor installed in the turn indicator 201 that the audio identifying device 100 has already obtained the driving action of the user, "turn on a turn signal".

Here, in the case where the audio identifying device 100 determines the output mode of the input audio "railroad crossing alarm" under these conditions, it determines an output mode (the shift value "+2") which is two level higher than the state before turning on the turn signal according to the output mode definition information described in FIG. 2B, and outputs the audio identification result by "10 dBA" higher volume according to the output processing method definition information described in FIG. 2A. Note that when the user performs an action, "turn off a turn signal", as a two level lower output mode (the shift value "−2") is determined, the volume returns to the same volume as the volume before turning on the turn signal.

Furthermore, in this case, when audio of the vehicle audio system is played back inside the vehicle 200, the audio identifying device 100 may lower the audio volume inside the vehicle and reproduce the audio identification result at a volume higher than the audio inside the vehicle.

As such, in the case where it is judged, according to the circumstance which varies depending on the action of the user, that the importance of notifying the user of the identification result regarding the input audio is high (more specifically in this example, during the time when it is expected that the user has difficulties in visually identifying the railroad crossing, from the time when the user turns on the turn signal to the time when turning it off), it is possible to notify the user of the important information by increasing the volume of the audio identification result output.

It is conceivable that the importance level of notifying the user of "railroad crossing alarm" is high for the purpose of preventing an accident in which the vehicle enters a railroad crossing due to the delay in visually identifying the railroad crossing by the user from the time when the user turns on a turn signal to the time when turning it off. Thus, with the aforementioned operations of the audio identifying device 100, it is possible to reproduce the audio identification result at a high volume using the output mode represented by a greater value which reflects the higher importance level.

Furthermore, as it is less likely that such accident happens during the time when the user applies the hand brake to the time when releasing it, it is conceivable that the importance level is low. Thus, it is possible to reproduce the audio identification result at a low volume using the output mode represented by a less value which reflects the less importance level.

Furthermore, for example, in the case where the checking unit 104 judges that the input audio is the most similar to "engine sound of a motorcycle", the following processing is performed.

From the time when the user action obtainment unit 108 detects the action of "turn on a turn signal" to the time when detecting "turn off a turn signal" (in other words, the driving state is conceivable to be "turning left or right"), the output mode determination unit 106 determines a 2 level higher output mode for the input audio. Then, the audio identification result output processing unit 110 performs the setting to increase the volume for reproducing the identification result regarding the input audio by "10 dBA", and reproduces the input audio stored in the audio storage unit 103 as an audio identification result output at the set volume.

On the other hand, even when the checking unit 104 judges that the input audio is "engine sound of a motorcycle", the output mode determination unit 106 determines a one level lower output mode for the input audio during the time when the action "apply a hand brake" is detected to the time when the action "release a hand brake" is detected (in other words, the driving state is conceivable to be "being stopped"). Then, the audio identification result output processing unit 110 performs the setting to lower the volume for reproducing the identification result regarding the input audio by "5 dBA" in accordance with the determination, and reproduces the input audio stored in the audio storage unit 103 as an audio identification result output at the set volume.

With the aforementioned operations of the audio identifying device 100, when the user is driving the vehicle, in the case where the driving state is "turning left or right", "engine sound of a motorcycle" is reproduced at a high volume, since the importance level is high for the purpose of preventing the user from not being involved in a collision in turning left or not bumping into each other in turning right. In the case where the driving state is "being stopped", "engine sound of a motorcycle" is reproduced at a low volume, since it is less likely that such accident happens and is conceivable that the importance level is low.

As such, according to the audio identifying device 100, it becomes possible to output an audio identification result in an output mode which reflects the importance level to be assumed according to the circumstance which varies depending on the action of the user.

Example of a Variation According to the First Embodiment

Next, as an example of a variation of the audio identifying device 100 according to the first embodiment, an audio identifying device which provides an identification result of audio for the user in an output mode determined further based on an arrival direction of input audio is described hereinafter. The audio identifying device according to this example of the variation can notify a driver, who is a user of the device, of the identification result regarding the input audio in an output mode determined depending on the arrival direction of the input audio and the driving action of the user.

As such, a case where an arrival direction of audio is also considered is described hereinafter. The audio source state information obtainment unit 109 described in FIG. 1 outputs, to the output mode determination unit 106, an audio source state of audio inputted from the audio input unit 101, in other words, an arrival direction of the audio. For example, the audio source state information obtainment unit 109 can be implemented by a microphone alley made up of plural microphone elements.

The audio source state information obtainment unit 109 having a function of detecting an arrival direction of audio is an example of an audio source direction detection unit.

FIG. 5A is a diagram showing an example of the output processing method definition information stored in the output processing method definition information storage unit 111. As well as FIG. 2A, the output processing method definition information defines that input audio is reproduced depending on the volumes corresponding to respective five output modes and the input audio is outputted as the identification result. The output modes exemplified herein are represented by the values from 1 to 5, and the magnitude of each value reflects the extent of an importance level to which the user should be notified of the identification result.

FIG. 5B is a diagram showing an example of output mode definition information stored in the output mode definition information storage unit 107. While the output mode definition information exemplified in FIG. 2B defines shift values of output modes each corresponding to the action of the user, there is a change in the output mode definition information exemplified herein, which defines output modes corresponding to the respective states of the user and arrival directions of audio for respective types of input audio including "railroad crossing alarm", "sirens of a fire fighting vehicle", "horns", "engine sound of a motorcycle", and "engine sound of a vehicle".

Here, the states of the user indicate, in the broad sense, the circumstance which varies depending on the action of the user, and for example, a "driving state" is one of the examples. This "driving state" is changed to "being stopped" with the aforementioned action of "apply a hand brake", and to "being able to drive" with the action of "release a hand brake".

Such states of the user, for example, may be stored in the output mode determination unit 106 using a resistor, an RAM, or the like which is not illustrated in the diagram, and updated according to the information regarding the action of the user obtained from the user action obtainment unit 108. Furthermore, it is conceivable that the user action obtainment unit 108 itself manages such states of the user and outputs the latest state of the user to the output mode determination unit 106.

FIG. 5C is a diagram showing an example of the state of the user stored in the output mode determination unit 106. Here, an example is shown that the aforementioned "driving state" has been changed to "being able to drive".

Once the output mode determination unit 106 obtains, from the user action obtainment unit 108, information regarding "apply a hand brake", it changes the "driving state" to "being stopped" and once obtaining information regarding the action "release a hand brake", it changes the state to "being able to drive".

FIG. 5D is a diagram showing an example of an audio source state obtained by the audio source state information obtainment unit 109. The audio arrival direction, such as "front" and "rear", exemplified in FIG. 5D, can be identified from the microphone alley made up of plural microphone elements which is installed in the front and rear of the vehicle. Here, although only "front" and "rear" are exemplified, for example, audio arrival directions, such as "front right" or "rear left" may be identified through the combined use of "right" or "left" with "front" or "rear".

Then, the output mode determination unit 106 according to the example of the variation determines an output mode of an identification result based on the identification result obtained from the checking unit 104, the state of the user stored in the output mode determination unit 106, information regarding the audio arrival direction obtained from the audio source state information obtainment unit 109, and the output mode definition information stored in the output mode definition information storage unit 107.

Although the operations of the audio identifying device 100 having the aforementioned configuration in the case where the audio arrival direction is also considered are the almost same as shown in the flowchart described in FIG. 3, the following points are different.

First, it differs in that between Steps S108 and 5110 in FIG. 3, a step (unillustrated) is added in which the output mode determination unit 106 obtains information regarding the audio arrival direction obtained by the audio source state information obtainment unit 109.

Second, it differs in that, in order to determine an output mode, the output mode determination unit 106: first updates the driving state according to the information regarding the action of the user obtained in Step S108; then refers to the output mode stored in the output mode definition information storage unit 107, based on the obtained audio arrival direction, the updated driving state, and the judgment result of audio type which is obtained from the checking unit 104; and determines the referred output mode as an output mode in which the identification result is provided for the user.

As the specific example, it is assumed in the description hereinafter that the inputted ambient audio outside of the vehicle is identified as "railroad crossing alarm".

In this case, once the driving state stored in the output mode determination unit 106 is "being able to drive" and the audio source state information obtainment unit 109 identifies that the audio arrival direction is "front", the output mode determination unit 106 determines the output mode of the identification result as "5" by referring to the output mode definition information described in FIG. 5B.

Then, the audio identifying result output processing unit 110 refers to the output processing method definition information described in FIG. 5A, and determines an output processing method corresponding to the determined output mode. As the determined output mode is "5" in the above example, an audio processing method of reproducing the audio signal stored in the audio storage unit 103 at "70 dBA" is determined as an audio identification result output.

When the user action obtainment unit 108 identifies that the driving state stored in the output mode determination unit 106 is "being able to drive" and the audio source state information obtainment unit 109 identifies that the audio arrival direction is "rear", the output mode determination unit 106 determines the output mode of the identification result as "1" by referring to the output mode definition information described in FIG. 5B.

Then, the audio identifying result output processing unit 110 refers to the output processing method definition information described in FIG. 5A, and determines an output processing method corresponding to the determined output mode. As the determined output mode is "1" in the above case, an audio processing method of reproducing the audio signal stored in the audio storage unit 103 at "50 dBA" is determined as an audio identification result output.

Figure 6A:
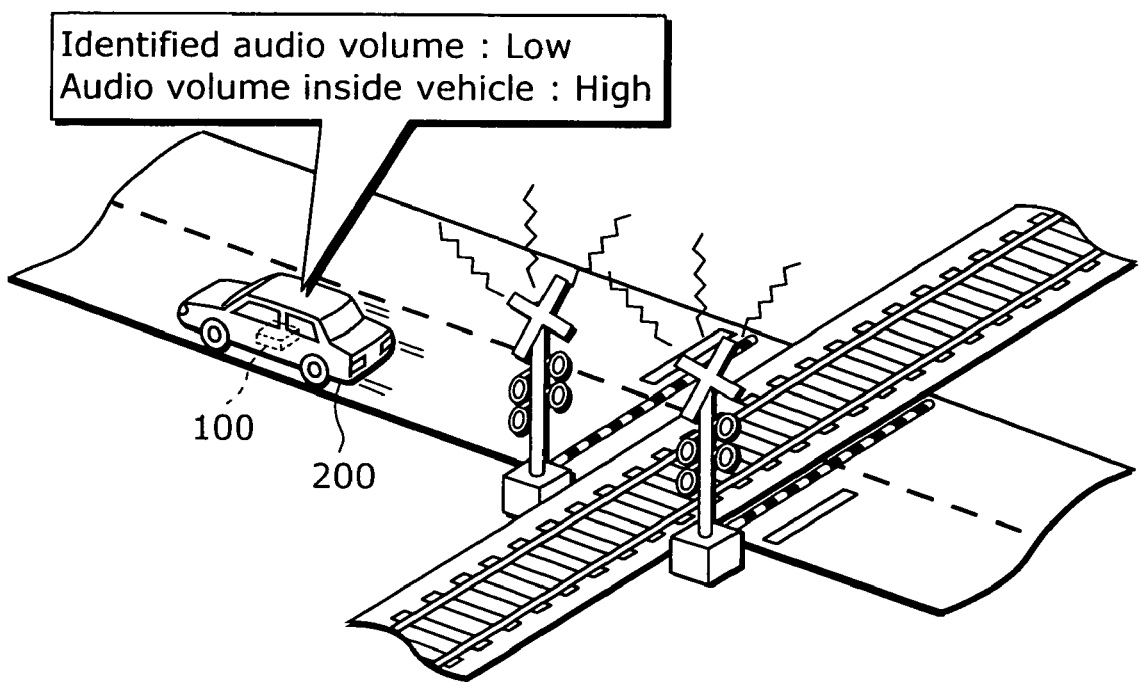
FIGS. 6A and 6B are diagrams for describing respective operation examples of the audio identifying device in the case where an audio arrival direction is considered.
Figure 6B:
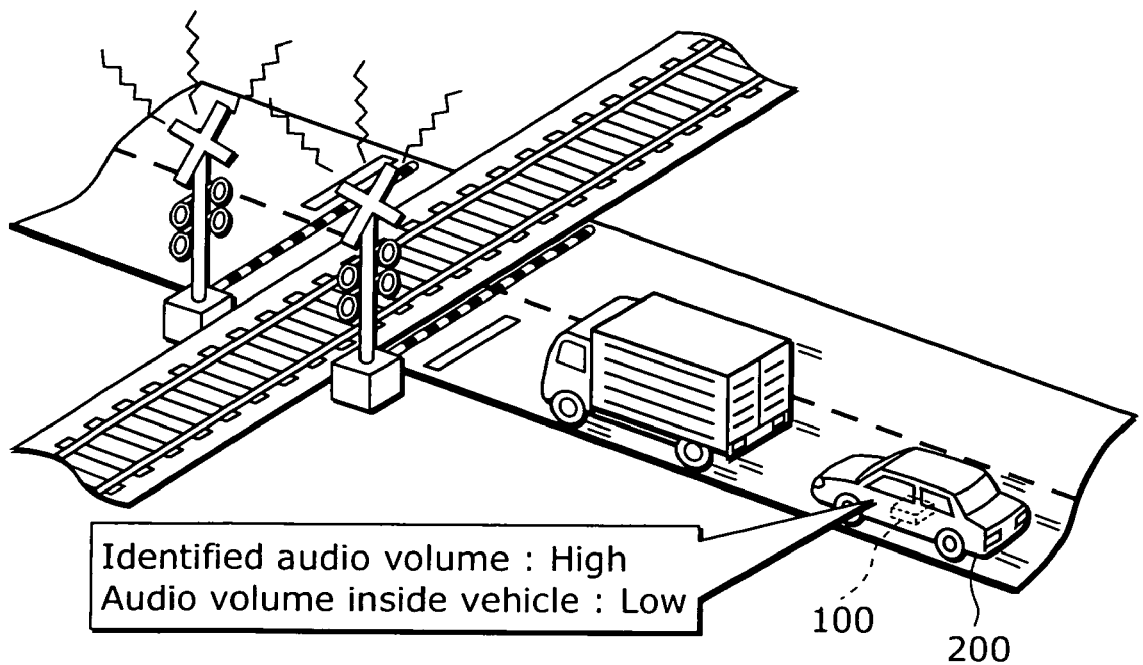

As such, another example of outputting an audio identification result in a different output mode depending on a driving state and an audio arrival direction is described using FIGS. 6A and 6B.

FIG. 6A shows that after the vehicle 200 equipped with the audio identifying device 100 passes the railroad crossing, the railroad crossing gate is closed and the railroad crossing alarm is sounding.

In other words, under the aforementioned conditions, it is conceivable that "railroad crossing alarm" has been inputted from the "rear" of the vehicle into the audio identifying device 100 as ambient audio outside of the vehicle, and the driving state is "being able to drive".

The audio identifying device 100 determines the output mode of the input audio "railroad crossing alarm" under this circumstance as "1" corresponding to "being able to drive" and "rear" by referring to the output mode definition information described in FIG. 5B, and outputs the audio identification result at "50 dBA" from the output processing method definition information described in FIG. 5A.

Furthermore, in this case, when audio of the vehicle audio system is played back inside the vehicle 200, while the audio volume remains unchanged, the audio identifying device 100 may reproduce the audio identifying result at a volume lower than the audio inside the vehicle.

As such, in the case where it is judged, based on not only the action state of the user, but also the audio arrival direction, that the importance level for notifying the user of the input audio is low, the volume of the audio identification result output is lowered. As a result, the user can continue to listen to the audio inside the vehicle without being interrupted, by reproducing the audio identification result.

FIG. 6B shows that the railroad crossing gate is closed, the railroad crossing alarm is sounding, and the vehicle 200 equipped with the audio identifying device 100 is driving straight ahead toward the railroad crossing in the state where the user can not visually identify this railroad crossing.

In other words, under the aforementioned conditions, it is conceivable that "railroad crossing alarm" has been inputted from the "front" of the vehicle into the audio identifying device 100 as ambient audio outside of the vehicle, and the driving state is "being able to drive".

The audio identifying device 100 determines the output mode of the input audio "railroad crossing alarm" under this circumstance as "5" corresponding to "being able to drive" and "front" by referring to the output mode definition information described in FIG. 5B, and outputs the audio identification result at "70 dBA" from the output processing method definition information described in FIG. 5A.

Furthermore, in this case, when audio of the vehicle audio system is played back inside the vehicle 200, the audio identifying device 100 may lower the audio volume inside the vehicle and reproduce the audio identifying result at a volume higher than the audio inside the vehicle.

As such, in the case where it is judged, based on not only the action state of the user, but also the audio arrival direction, that the importance level for notifying the user of the input audio is high, it becomes possible to notify the user of important information by increasing the volume of the audio identification result output.

With the aforementioned operations of the audio identifying device 100, when the user is driving the vehicle, in the case where the driving state is "being able to drive" and the user hears the alarm from the front of the vehicle, "railroad crossing alarm" can be reproduced at a large volume, since the importance level is high. In the case where the driving state is "being able to drive" and the user hears the alarm from the rear of the vehicle, the alarm can be reproduced at a low volume, since the importance level is relatively low.

Furthermore, for example, when the checking unit 104 judges that the input audio is the most similar to "sirens of a fire fighting vehicle", the following processing is performed.

In other words, in the case where the user action obtainment unit 108 identifies that the driving state is "being able to drive" and the audio source state information obtainment unit 109 identifies that the audio arrival direction is "front", the output mode determination unit 106 determines the output mode as "5" and the audio identifying result output processing unit 110 performs the setting of volume so as to reproduce the audio signal stored in the audio storage unit 103 at "70 dBA" as the output processing method corresponding to the output mode "5", and it reproduces the audio signal as the audio identification result output.

On the other hand, even when the checking unit 104 judges that the input audio is the most similar to "sirens of a fire fighting vehicle", in the case where the user action obtainment unit 108 identifies that the driving state is "being stopped" and the audio source state information obtainment unit 109 identifies that the audio arrival direction is "rear", the output mode determination unit 106 determines the output mode as "2" and the audio identifying result output processing unit 110 performs the setting of volume so as to reproduce the audio signal stored in the audio storage unit 103 at "55 dBA" as the output processing method corresponding to the output mode "2", and it reproduces the audio signal as the audio identification result output.

With the aforementioned operations of the audio identifying device 100, it becomes possible to output an audio identification result in a mode corresponding to the importance level which varies depending on the state of the user and the audio arrival direction. Thus, "sirens of a fire fighting vehicle" can be reproduced at a large volume as the importance level is high when the user hears the "siren of a fire fighting vehicle" from the front of the vehicle in a state of "being able to drive", while the siren can be reproduced at a low volume as the importance level is relatively low when the user hears the siren from the rear of the vehicle in a state of "being stopped". Thus, it becomes possible to output the audio identification result in a mode corresponding to the importance level which varies depending on the driving state of the user and the audio source state.

As such, according to the audio identifying device 100 of the present first embodiment with the configuration including the checking unit 104, the output mode determination unit 106, the output mode definition information storage unit 107, the user action obtainment unit 108, the audio identification result output processing unit 110, and the output processing method definition information storage unit 111, the output mode determination unit 106 can determine, depending on the action of the user, an output mode corresponding to the audio type judged by the checking unit 104, and the audio identification result output processing unit 110 can output input audio as the audio identification result after performing processing according to the determined output mode on the input audio. Thus, it becomes possible to notify the user with certainty of audio information which is important for the user, according to the importance level of the input audio information which varies depending on the action of the user.

Furthermore, with the configuration including the audio source state information obtainment unit 109, as the output mode determination unit 106 can determine an output mode of an identification result further based on an audio arrival direction, it becomes possible to transmit audio information which is important for the user with certainty according to the importance level of the input audio information which varies depending on the action state of the user and the audio arrival direction.

Note that although the present first embodiment is described by assuming that the acoustic models stored in the acoustic model storage unit 105 are prepared per audio type regarding audio which is artificially outputted, such as a railroad crossing alarm and a siren of a fire fighting vehicle, it is possible to prepare acoustic models per audio type which arises naturally, such as a human spoken voice and an animal or bird call.

Furthermore, although the present first embodiment describes an example in that the audio source state information obtainment unit 109 obtains information regarding an audio arrival direction using a microphone alley and the output mode determination unit 106 uses the information for judging the importance level, it is possible that the audio source state information obtainment unit 109 obtains information, such as a size of the input audio signal, the duration, and the generation frequency of the input audio signal and the output mode determination unit 106 uses such information for judging the importance level.

Furthermore, although the present first embodiment describes an example in that the volume of input audio is set by increasing or decreasing the size of the input audio to the size corresponding to the volume depending on an importance level and the input audio is reproduced as an output processing method of the audio identification result outputted by the audio identification result output processing unit 110, the reproduction of the input audio may be repeated by the number of times corresponding to the importance level. Furthermore, it is possible to apply, as an output method, a method of causing a portion, which is in physical contact with the user, such as a chair on which the user is seated, to vibrate in an intensity corresponding to the importance level in reproducing the audio.

Furthermore, although the present first embodiment describes the reproduction of input audio as an example of a processing method of outputting the audio identification result outputted by the audio identification result output processing unit 110, it is possible to output, as an audio identification result, a name of the audio type corresponding to the acoustic model in character representation. When using such character representation, it is possible to output the audio identification result by performing processing which alters the size, brightness, color, and the like of the characters to be displayed, depending on the importance level of the audio information.

Furthermore, depending on the importance level of the input audio, the output of the audio identification result may be switched between the output of audio and the output in character representation. The audio identification result output processing unit 110 can control the output mode such that, for example, when the importance level of the input audio is high, the audio identification result is outputted by the output of audio, and when the importance level of the input audio is low, the audio identification result is outputted in character representation.

Second Embodiment

Next, the audio identifying device according to the second embodiment of the present invention is described using FIGS. 8 and 9.

The audio identifying device according to the second embodiment is incorporated into a headphone for a portable music player, and is a device which identifies audio information of ambient environments of the user who wears the present device, and which provides the identification result for the user by reproducing the audio through a speaker or a headphone of a cellular phone or a portable music player which is used by the user. Here, it is assumed that since the user wears audio equipment that has advanced sound-proof properties, such as a headphone for a portable music player or a earphone for a cellular phone, the user has difficulties in hearing audio of the ambient environment while moving, on foot, on a street, in a station, or inside a train. Also, it is assumed that according to the importance level depending on the action of the user, more specifically, the walking state of the user, processing is performed on the output mode of an identification result, and the identification result on which the processing is performed is notified to the user.

Although the configuration and the operations of the audio identifying device of the present second embodiment is almost the same as the configuration and the operations of the audio identifying device 100 of the first embodiment, it differs in obviously using importance levels each indicating a degree of importance at which audio identification result should be transmitted to the user. The following mainly describes the different points.

Figure 7:
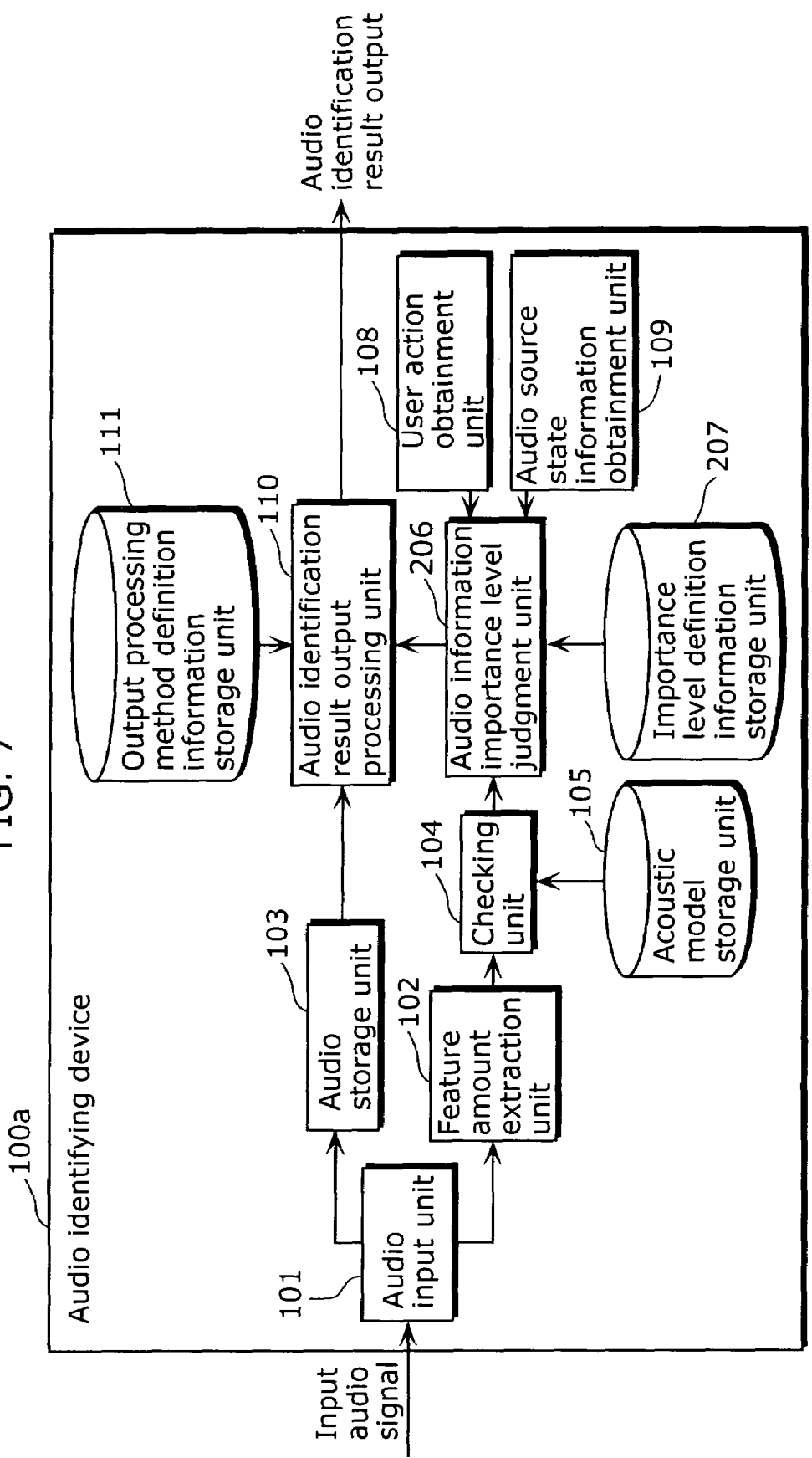
FIG. 7 is a block diagram showing a configuration of the audio identifying device according to the second embodiment of the present invention.

FIG. 7 is a block diagram showing a functional configuration of an audio identifying device 100a according to the present second embodiment. The audio identifying device 100a is configured by replacing the output mode determination unit 106 and the output mode definition information storage unit 107 in the audio identifying device 100 (refer to FIG. 1) with an audio information importance level judgment unit 206 and an importance level definition information storage unit 207 respectively.

Here, the audio information importance level judgment unit 206 is an example of an importance level judgment unit.

In the audio identifying device of the present second embodiment, three audio types are assumed as ambient sounds of the user who is moving on a street, in a station, and inside a train, such as "horns", "warning of a approaching train to a platform", and "audio announcements on a train for notifying arrival to a station", and corresponding to these audio types, the acoustic models having the same configuration as the first embodiment are stored in the acoustic model storage unit.

Furthermore, the importance level definition information storage unit 207 stores, in advance, definition information of respective importance levels defined for each of the aforementioned audio types.

FIG. 8B is a diagram showing an example of importance level definition information stored in the importance level definition information storage unit 207 of the audio identifying device according to the present second embodiment. As shown in FIG. 8B, "horns", "warning of a approaching train to a platform", and "audio announcements on a train for notifying arrival to a station" are indicated, and the importance levels each corresponding to the walking action of the user are defined.

Furthermore, the user action obtainment unit 108 is constituted by sensors which detect the actions of the user, obtains information regarding the actions of the user, and outputs the information to the audio information importance level judgment unit 206. Although the user action obtainment unit 108 detects the action which is completed relatively in a short time, such as "turn on/off a turn signal" in the first embodiment, the user action obtainment unit 108 detects the action of longer duration (in other words, the movement of the user), such as "walking" or "stop" in the present second embodiment.

FIG. 8C is a diagram showing an example of a walking state of the user which is obtained by the user action obtainment unit of the audio identifying device according to the present second embodiment. The walking state of the user, such as "walking" or "stop" exemplified in FIG. 8C can be detected by a pedometer equipped with an acceleration sensor, which constitutes the user action obtainment unit.

Furthermore, the output processing method definition information storage unit 111 stores definition information of output processing methods which are defined, in advance, for each importance level of audio information, and defines outputting of each identification result by reproducing the input audio at a volume corresponding to the importance level as shown in FIG. 8A.

The audio information importance level judgment unit 206 judges a importance level of input audio based on the judgment result obtained from the checking unit 104, the information regarding the action of the user obtained from the user action obtainment unit 108 and the importance level definition information stored in the importance level definition information storage unit 207, and outputs the judged result to the audio identification result output processing unit 110. Furthermore, the audio identification result output processing unit 110 determines which acoustic processing is performed on the audio signal stored in the audio storage unit 103 based on the importance level obtained from the audio information importance level judgment unit 206 and the definition information of the output processing methods which are defined per importance level and stored in the output processing method definition information storage unit 111, and outputs the audio signal on which the determined processing has been performed as an audio identification result output.

As a specific example, the case where the checking unit 104 of the audio identifying device according to the present second embodiment judges that the inputted ambient audio of the user is the most similar to "horns" is described herein.

In this case, when the user action obtainment unit 108 identifies that the walking state of the user is "stop", the audio information importance level judgment unit 206 judges the importance level of the input audio as "2" by referring to the importance level definition information described in FIG. 8B.

Then, the audio identifying result output processing unit 110 refers to the output processing method definition information described in FIG. 8A, and determines an output processing method corresponding to the judgment result of the received importance level. As the importance level is "2" in the above example, the output processing method of reproducing the audio signal stored in the audio storage unit 103 at "55 dBA" is determined as an audio identification result output.

On the other hand, when the user action obtainment unit 108 identifies that the walking state of the user is "walking", the audio information importance level judgment unit 206 judges the importance level of the input audio as "5" by referring to the importance level definition information described in FIG. 8B.

Then, the audio identifying result output processing unit 110 refers to the output processing method definition information described in FIG. 8A, and determines an output processing method corresponding to the judgment result of the received importance level. As the importance level is "5" in this example, the output processing method of reproducing the audio signal stored in the audio storage unit at "70 dBA" is determined as an audio identification result output.

Figure 9A:
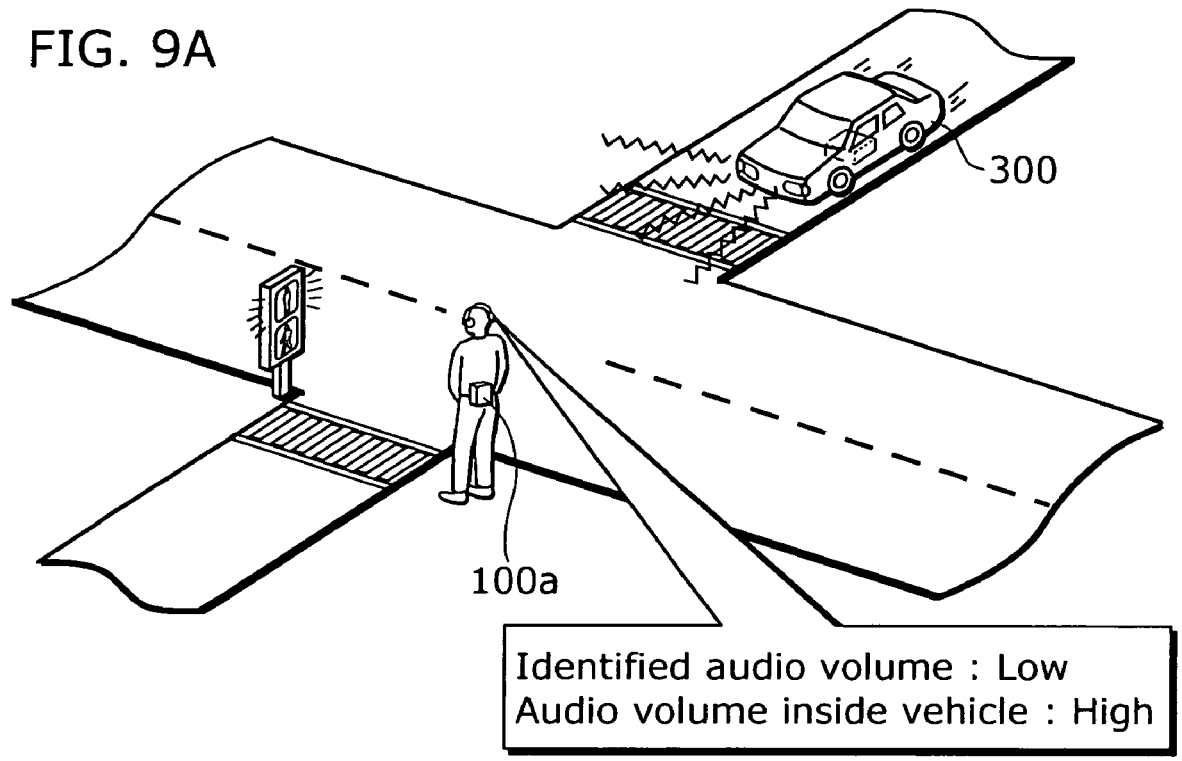
FIGS. 9A and 9B are diagrams for describing respective operation examples of the audio identifying device according to the present second embodiment.
Figure 9B:
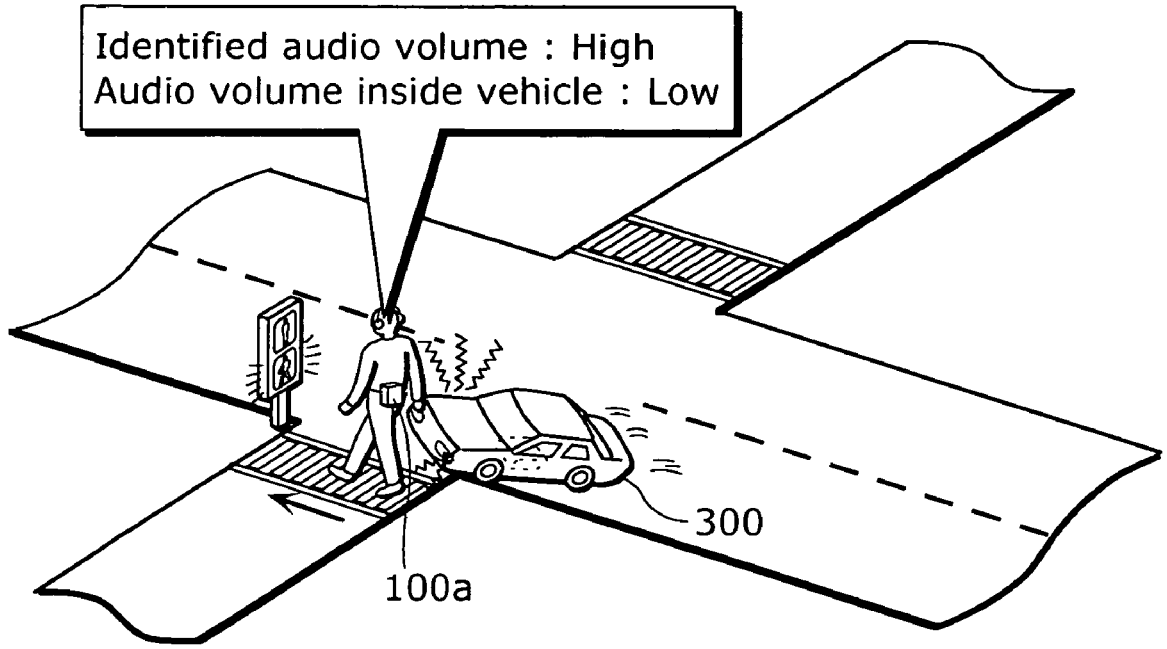
Figure 10:
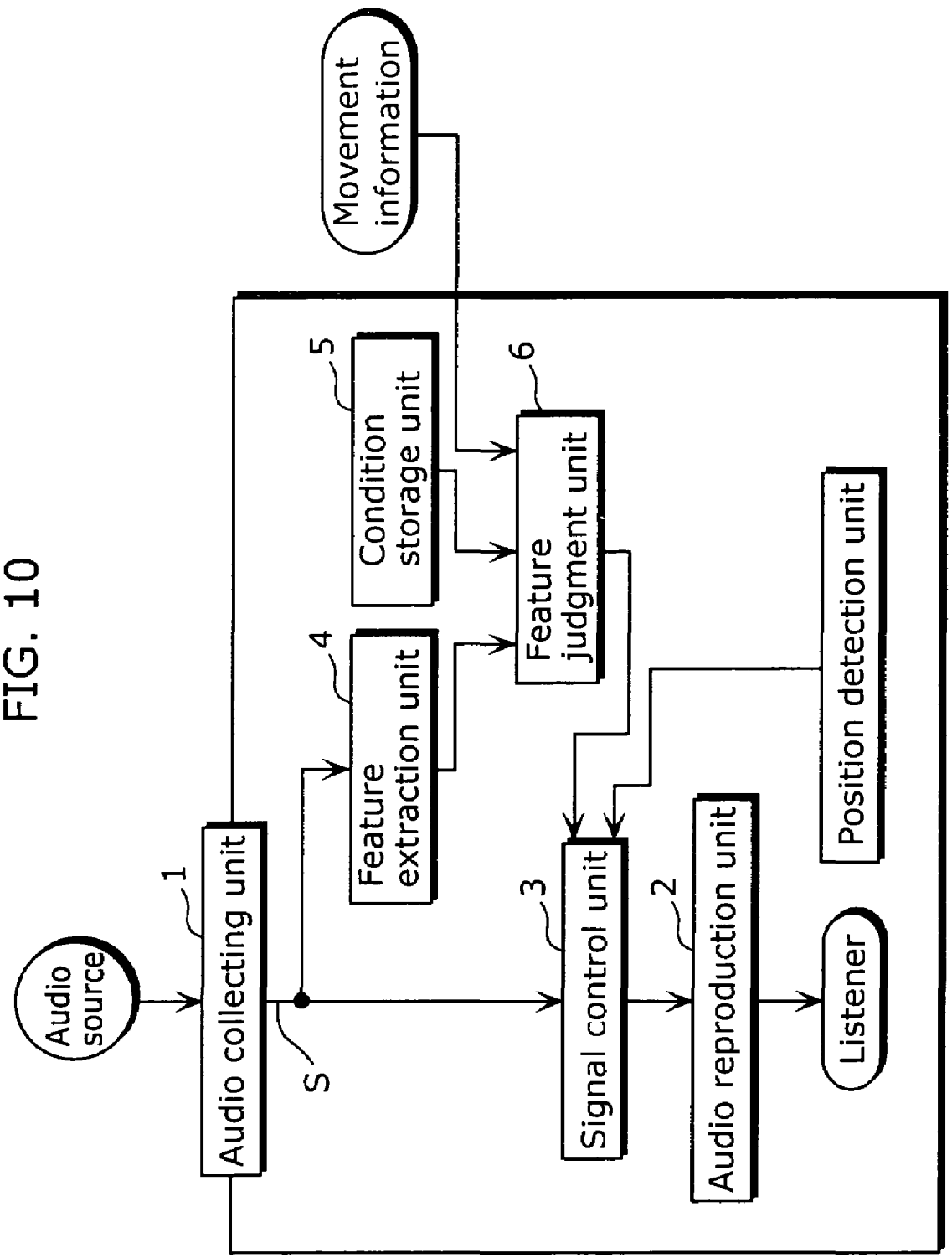
FIG. 10 is a diagram showing a configuration of the conventional technology.

In this manner, the output of an audio identification result varies according to the importance level which varies depending on the walking state of the user is described using FIGS. 9A and 9B.

FIG. 9A describes that the user who wears the audio identifying device 100a according to the present second embodiment stops at an intersection with a crosswalk and a vehicle 300 enters the intersection while sounding the horn.

In other words, under the conditions described herein, it is conceivable that "horns" as ambient audio of the user is inputted in the audio identifying device 100a and "stop" as the walking state of the user is obtained by the audio identifying device 100a.

Here, when the audio identifying device 100a judges the importance level of the input audio "horns" under this circumstance, as the judgment result that the importance level of the input audio is low (importance level "2") can be obtained from the importance level definition information described in FIG. 8B, the audio identifying device 100a outputs the audio identification result at "55 dBA" according to the output processing method definition information described in FIG. 8A.

Furthermore, in this case, the audio identifying device 100a may reproduce the audio identification result at a volume lower than the volume of the audio played back in the headphone for a portable music player, while maintaining the volume of the audio of the portable music player which incorporates the audio identifying device 100a.

In this manner, in the case where it is judged that the importance level of the input audio is low based on the walking state of the user, the user can listen to the audio by lowering the volume of the audio identification result output without being interrupted by unnecessary ambient audio information.

On the other hand, FIG. 9B describes that the user who wears the audio identifying device 100a according to the present second embodiment is crossing at a crosswalk while the vehicle 300 is turning left at the intersection, sounding the horn.

In other words, under the conditions described herein, it is conceivable that "horns" as ambient audio of the user is inputted in the audio identifying device 100a and "stop" as the walking state of the user is obtained by the audio identifying device 100a.

Here, when the audio identifying device 100a judges the importance level of the input audio under this circumstance, as the judgment result that the importance level of the input audio is high (importance level "5") can be obtained from the importance level definition information described in FIG. 8B, the audio identifying device 100a outputs the audio identification result at "70 dBA" according to the output processing method definition information described in FIG. 8A.

Furthermore, in this case, the audio identifying device 100a may reproduce the audio identification result at a volume higher than the volume of the audio played back in the headphone for a portable music player while lowering the volume of the audio of the portable music player which incorporates the audio identifying device 100a.

In this manner, in the case where it is judged that the importance level of the input audio is high based on the walking state of the user, it becomes possible to notify the user of the important information by increasing the volume of the audio identification result output.

Through the aforementioned operations of the audio identifying device 100a, when the user is moving on foot, in the case where the walking state is "walking", the audio identification result can be reproduced at a high volume, since it is conceivable that the importance level of "horns of a vehicle" is high for the purpose of preventing the user from continuing to walk without noticing the approach of a vehicle and colliding with the vehicle. In the case where the walking state of the user is "stop", the audio identification result can be reproduced at a low volume, since it is conceivable that the importance level of "horns of a vehicle" is low due to the low probability of such accident.

Furthermore, for example, the checking unit 104 of the audio identifying device according to the present second embodiment judges that the input audio is the most similar to "audio announcements on a train for notifying arrival to a station", the following processing is performed.

In other words, when the user action obtainment unit identifies that the walking state is "stop", it is conceivable that the user is on a train and does not notice that the train has arrived at a station, the audio information importance level judgment unit 206 judges that the importance level of the input audio is high, in other words, the level is "5". Then, the audio identification result output processing unit performs the setting of volume so as to reproduce the audio signal stored in the audio storage unit at "70 dBA" as the output processing method corresponding to the output mode "5", and reproduces the audio signal as the audio identification result output.

On the other hand, in the case where the checking unit 104 judges that the input audio is the most similar to "audio announcements on a train for notifying arrival to a station", even when the walking state is "walking", it is conceivable that the user has already noticed the arrival to the station and is walking for getting off the train. Thus, the audio information importance level judgment unit judges that the importance level of the input audio is relatively low, in other words, "2", and the audio identification result output processing unit performs the setting of volume so as to reproduce the audio signal stored in the audio storage unit at "55 dBA" as the output processing method corresponding to the output mode "2", and reproduces the audio signal as the audio identification result output.

Through the aforementioned operations of the audio identifying device, when the user is moving on foot, in the case where the walking state is "stop", "audio announcements on a train for notifying arrival to a station" can be reproduced at a high volume, since it is conceivable that the importance level of the announcements is high for the purpose of preventing the user from missing the station. In the case where the walking state is "walking", the announcements can be reproduced at a low volume, since it is conceivable that the importance level is low due to the low probability of missing the station. Thus, it becomes possible to output the audio identification result in the identification result output mode corresponding to the importance level which varies depending on the walking state of the user.

In this manner, according to the audio identifying device of the present second embodiment with the configuration including the checking unit 104, the audio information importance level judgment unit 206, the importance level definition information storage unit 207, the user action obtainment unit 108, the audio identification result output processing unit 110, and the output processing method definition information storage unit 111, the audio information importance level judgment unit 206 can judge the importance level of the input audio based on the similarity judgment result judged by the checking unit 104, and based on the judgment result, the audio identification result output processing unit 110 can perform the processing corresponding to the output mode on the input audio and output it as the audio identification result. Thus, it becomes possible to notify the user with certainty of audio information which is important for the user, according to the importance level of the input audio information which varies depending on the action of the user.

Note that although the present second embodiment describes the example in which the user action obtainment unit implemented by the pedometer and the like obtains the walking state of the user and the audio information importance level judgment unit judges the importance level of the audio information based on the walking state, it is also possible to identify the action state of the user from the information regarding a key operation of a cellular phone or a button operation of a headphone for a portable music player.

Furthermore, although the present second embodiment describes the example of the configuration of the audio identifying device which is incorporated in a headphone for a portable music player or a cellular phone which is used by the user, the audio identifying device may be implemented by an independent configuration in which the audio identifying device is not incorporated in such equipment.

Furthermore, as the first embodiment, the present second embodiment can also easily determine an output mode which reflects an importance level depending on a direction from which audio arrives, using importance level definition information obtained further based on the audio arrival direction.

As such, although the audio identifying device of the present invention is described based on each of the embodiment, it is obvious that the present invention is not limited to these embodiments and can be modified or amended in various ways without departing from the scope and spirit of the present invention.

Each of the aforementioned embodiments is described, for example, assuming that the audio identifying device is used in a highly closed space, such as inside a vehicle or with a headphone for a portable music player. For example, in the case where the user who is in doors is assumed, the respiration movement of the user is detected, and it is judged, based on the detected respiration, that the user is sleeping. Then, when the input audio is judged as suspicious noise, such as noise of breaking a window, as the application of the present invention, it is possible to increase the volume and reproduce the audio identification result.

INDUSTRIAL APPLICABILITY

The audio identifying device according to the present invention can transmit with certainty audio information which is important to a user according to the importance level which varies depending on the action state of the user, and can be applied to in-vehicle supplemental safety devices for the purpose of helping the user drive safely, information terminal devices, such as cellular phones for the purpose of providing information of ambient environments for the user who is moving on foot or by train, or headphones and the like equipped with the present device. Furthermore, the audio identifying device is useful as a security device and the like which is installed in a home or an office for the purpose of preventing crime or an accident.

The invention claimed is:

1. An audio identifying device which identifies audio which is present in an ambient environment outside of a vehicle and provides a result of the identification for a user who drives the vehicle, said device comprising:

an audio type judgment unit operable to judge a type of the audio using a feature of an audio signal which represents the audio;

a user action detection unit operable to detect a driving action of the user, wherein the driving action of the user is an operation performed by the user on a mechanism located inside of the vehicle;

an audio storage unit operable to store the audio signal; and an identification result output unit operable to determine an output mode for providing the user with the identification result based on the type judged by said audio type judgment unit and the driving action detected by said user action detection unit, and to output, in the determined output mode, the audio signal stored in said audio storage unit as the identification result.

2. The audio identifying device according to claim 1,
wherein the audio is at least one of railroad crossing alarm, a siren of a fire fighting vehicle, a horn, engine sound of a motorcycle, and engine sound of a vehicle.

3. The audio identifying device according to claim 1,
wherein said identification result output unit is operable to perform acoustic processing on the audio signal based on the determined output mode, and to output the audio signal on which the acoustic processing has been performed.

4. The audio identifying device according to claim 1, further comprising
an audio source direction detection unit operable to detect a direction from which the audio arrives,
wherein said identification result output unit is operable to determine the output mode further based on the direction detected by said audio source direction detection unit.

5. The audio identifying device according to claim 1, further comprising
an importance level judgment unit operable to judge an importance level, from among a plurality of predetermined importance levels, based on the type judged by said audio type judgment unit and the driving action detected by said user action detection unit, the judged importance level indicating a degree of importance at which the identification result should be transmitted to the user,
wherein said identification result output unit is operable to determine the output mode depending on the importance level judged by said importance level judgment unit, and to output the identification result in the determined output mode.

6. The audio identifying device according to claim 5, further comprising
an importance level definition information storage unit operable to store importance level definition information which defines, for each driving action of the user, importance levels for each of a plurality of audio type types,
wherein said importance level judgment unit is operable to judge the importance level by checking, with the importance level definition information, the type judged by said audio type judgment unit and the driving action detected by said user action detection unit.

7. The audio identifying device according to claim 5, further comprising
an audio source direction detection unit operable to detect a direction from which the audio arrives, and
an importance level definition information storage unit operable to store importance level definition information which defines importance levels for each of a plurality of audio types for each driving action of the user and for each direction from which the audio arrives,
wherein said importance level judgment unit is operable to judge the importance level by checking, with the importance level definition information, the type judged by said audio type judgment unit, the driving action detected by said user action detection unit, and the direction detected by said audio source direction detection unit.

8. The audio identifying device according to claim 5, further comprising
an output processing method definition information storage unit operable to store output processing method definition information which defines output modes of the identification result per importance level,
wherein said identification result output unit is operable to determine the output mode by checking the importance level judged by said importance level judgment unit with the output processing method definition information.

9. The audio identifying device according to claim 8,
wherein the output processing method definition information defines, as the output modes, output volume when the identification result is outputted as audio.

10. The audio identifying device according to claim 8,
wherein the output processing method definition information defines, as the output modes, the number of outputs of the identification result.

11. The audio identifying device according to claim 1, wherein the mechanism located inside of the vehicle is a brake device.

12. The audio identifying device according to claim 1, wherein the mechanism located inside of the vehicle is a turn signal indicator.

13. An audio identifying method for identifying audio which is present in an ambient environment outside of a vehicle and provides a result of the identification for a user who drives a vehicle, said method comprising:
an audio type judgment step of judging a type of the audio using a feature of an audio signal which represents the audio;
a user action obtainment step of detecting a driving action of the user, wherein the driving action of the user is an operation performed by the user on a mechanism located inside of the vehicle;
an audio storing step of storing the audio signal; and
an identification result output step of determining an output mode for providing the user with the identification result based on the type judged in said audio type judgment step and the driving action detected in said user action obtainment step, and outputting, in the determined output mode, the audio signal stored in said audio storing step as the identification result.

14. The audio identifying method according to claim 13, wherein the mechanism located inside of the vehicle is a brake device.

15. The audio identifying method according to claim 13, wherein the mechanism located inside of the vehicle is a turn signal indicator.

16. A computer-readable medium having a program embodied thereon, the program being for use with an audio identifying device which identifies audio which is present in an ambient environment outside of a vehicle and provides a result of the identification for a user who drives a vehicle, said program causing a computer to execute a method comprising:
an audio type judgment step of judging a type of the audio using a feature of an audio signal which represents the audio;
a user action obtainment step of detecting a driving action of the user, wherein the driving action of the user is an operation performed by the user on a mechanism located inside of the vehicle;
an audio storing step of storing the audio signal; and an identification result output step of determining an output mode for providing the user with the identification result based on the type judged in said audio type judgment step and the driving action detected in said user action obtainment step, and outputting, in the determined output mode, the audio signal stored in said audio storing step as the identification result.

17. The computer-readable medium according to claim 16, wherein the mechanism located inside of the vehicle is a brake device.

18. The computer-readable medium according to claim 16, wherein the mechanism located inside of the vehicle is a turn signal indicator.

* * * * *